L. C. St. John,
Hydraulic Engine,
N° 10,869.        Patented May 2, 1854.
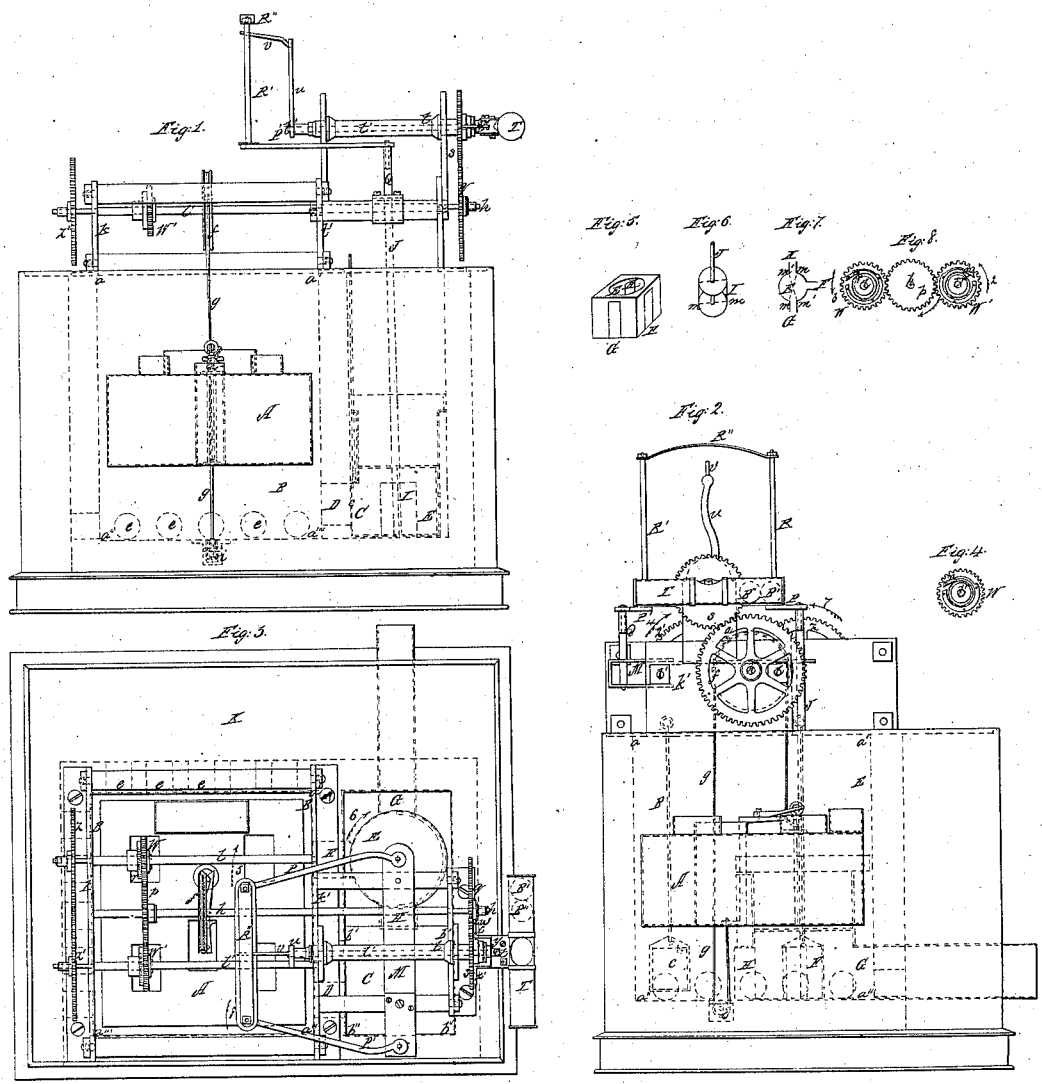

UNITED STATES PATENT OFFICE.

L. C. ST. JOHN, OF BUFFALO, NEW YORK.

HYDRODYNAMIC ENGINE.

Specification of Letters Patent No. 10,869, dated May 2, 1854.

*To all whom it may concern:*

Be it known that I, LE GRAND C. ST. JOHN, of Buffalo, in the county of Erie and State of New York, have invented a new and useful Improvement in Hydrodynamic Machines; and I do hereby declare that the following is a full, clear, and exact description of the construction and operation of the same, reference being had to the annexed drawings, forming part of this specification, in which—

Figure 1 is a side elevation of the machine. Fig. 2 is an end elevation. Fig. 3 is a plan of the same. Fig. 4 is a side view of wheel W. Fig. 5 is a view of the ingress and egress chamber, made on a small scale. Fig. 6 is a view of the hollow semicylinder on a small scale. Fig. 7 is a diagram showing the action of the semicylinder. Fig. 8 is a side elevation of wheels $w$ $p$ $w'$.

Similar letters of reference in the several figures denote the same part of the machine.

The object of my invention is to furnish the means of bringing into effective action the force possessed by water in its rise and fall.

It consists in the employment of a float connected by mechanism hereafter to be described, with the apparatus for letting the water to and from the chamber in which the float operates: together with mechanism for changing the motion produced by the rise and fall of the float into a continuous rotary motion.

In the drawing A is the float operating vertically in the chamber B, as the water is let on and drawn from said chamber. This chamber B is shown in the drawings by the rectangle $a$, $a'$, $a''$, $a'''$, in red lines, and communicates with the feed chamber C (shown in Fig. 3 by the rectangle $b$, $b'$, $b''$, $b'''$,) by the passage D, closed by the valve $c$; and by the ingress and egress chamber E as will be hereafter described.

The ingress and egress chamber E is a circular well, having the three passages F, G, and H leading from it, as shown on a small scale in Fig. 5. The channel G is for conveying the water from the machine. In this well E fits the semicylinder I with entire circular heads as shown on a small scale in Fig. 6, so that the semicylinder is capable of alternately opening two and closing one of the passages F, G, H, for purposes to be described. The float chamber communicates with the portion K of the apparatus, by channels $e$, and is so regulated that the whole portion of the machine to which water is admitted through the channel F and the opening D closed by the valve $c$ is double the area of the float. The chamber K is merely a continuation of the float chamber B, the water flowing in and out through the channels $e$; the effect being the same as though the chambers B and K formed a single chamber of double the area of the float; which in practice would be the best mode of construction. The float chamber should be double the area of the float, so that the float will begin to move with the least possible depth of water around it; such arrangement giving the greatest vertical movement of the float, without using water in vain. It will be understood that as the chamber K may form a portion of the float chamber, it may be uncovered, and is not therefore required to be air tight.

In the bottom of chamber B is a pulley $i$ over which passes the cord $g$ attached at one extremity to the bottom of the float A and by the other extremity to the top of the float, after passing over the pulley $f$ on the shaft $h$, so that the admission of water into the chamber B will raise the float A and revolve the shaft $h$. On each side of the shaft $h$ is one of the shafts $l$ and $l'$ having their bearings in the uprights $k$, $k'$; these shafts have on them the cog wheels W and W' meshing into the wheel $p$ on the shaft $h$ but placed loose on said shafts $l$ $l'$ so as to be capable of turning upon the shafts when moving so that one of the pawls $n$ $n'$ shall slip over one of the ratchets $r$ $r'$ fastened to the said shafts $l$ $l'$.

The semicylinder I is held by the vertical shaft J, the lower extremity resting in the bottom of the well E, and the upper secured to the arm P, so that the oscillation of said arm will give the semicylinder the necessary movement for alternately shutting one of the passages F, G, H, and opening two, as above mentioned.

At the opposite extremity of the plate M from that through which the shaft J passes is the short vertical shaft Q, rising to the level of the top of the shaft J and carrying an arm P′ similar to the arm P of the shaft J. From the said arms P P′ arise the standards R R′ connected at top by the brace R″.

On the outer extremity of the shaft $h$ is the wheel $q$ meshing into the wheel $s$ on the hollow shaft $t$ so as to impart to said wheel the opposite partial revolutions of the shaft $h$. On the outer extremity of the shaft $t′$, which is situated within the shaft $t$ is held the tube T containing the balls B′ B″, and on the inner extremity of the same shaft is the arm $u$ having attached the stud $v$, which by the alternate partial revolutions of the shaft $t′$ will alternately strike the standards R R′, oscillating the arms P P′ and causing the alternate partial revolutions of the shaft J required to produce the above described action of the semicylinder I upon the passages F, G, H. This alternate partial revolution of the shaft $t′$ is produced by the alternate running of the balls B′ B″ in the opposite ends of the tube T, causing said tube to assume a vertical position, with the opposite ends of the same alternately uppermost. This motion of the tube T is caused by the action of the wheel $s$ on the shaft $t$, the stud $w$ of which at each alternate partial revolution of the shaft $h$ strikes one of the arms $x$ $x′$ of the block $y$ holding the tube, and carries the tube around until the balls move and give the tube a vertical position, as they change their resting place.

The operation of my improved hydrodynamic machine is as follows: Water is admitted to the machine over the top of chamber C, by a chute, or pipe or in any other convenient and suitable manner. When it is desired to set the apparatus in motion, the valve $c$ is drawn up, admitting water into the chamber B from the chamber C, by the passage D; this raises the float A and by means of the band $g$ and pulley $f$ turns the shaft $h$ and wheel $p$ as shown by arrow 1 (Fig. 8) causing the wheel W′ to revolve as shown by arrow 2 and wheel W as indicated by arrow 3, the former rotating its shaft because of the pawl $n′$ catching in the ratchet $r′$ and the latter slipping over its shaft by reason of the slipping of the pawl $n$ over the ratchet $r$. The rotation of the shaft $l′$ turns the wheel $z′$ as indicated by arrow 4, communicating a similar inward rotation of the wheel $z$ meshing into it. The rotation of the wheel $p$ produces a revolution of the wheel $s$ and shaft $t$ in the opposite direction from that of the shaft $h$, until the stud $w$ strikes one of the arms $x$ (Fig. 3), and the balls B′ B″ running to the opposite extremity of the tube T causes the tube to rapidly assume a vertical position, revolving the shaft $t′$ within the shaft $t$, and carrying the stud $v$ smartly against the standard R, moving the arm P in the direction of arrow 5 and revolving the cylinder I as shown by arrow 6, so as to open the passages F and G and close the passage H, as shown by line $m$ $m$ Fig. 7. The opening of the passage F lets the water from the float well, and causes the descent of the float, which produces directly the reverse action upon the various shafts and wheels which obtained at the rising of the float, namely:—the wheels W W′ revolve in the opposite direction from that shown by arrows 2 and 3, causing the pawl $n$ of the wheel W to catch in the ratchet $v$ and revolve the shaft $l$ and wheel $z$ as shown by arrow 7, thus giving the wheels $z$ $z′$ the same rotation as caused by the rising of the float, so that a continuous rotary motion of those wheels is produced by the rise and fall of the float. The reverse movement of the wheel $p$ caused by the descent of the float, produces a corresponding reverse motion of the wheel $s$, carrying the stud $w$ around to the arm $x′$, and turning the shaft $t′$ until the balls B′ B″ change their position in the tube T, and running to the other extremity from that previously occupied, carry the tube to a vertical position, the reverse of that previously described. The rapid falling of the tube causes the stud $v$ to press against the standard R′ and move the arm P′ as shown by arrow 8, producing thereby a reverse revolution in the shaft J and semicylinder I from that shown by arrow 6. This closes the passage G and opens the passages H and F, (line $m′$ $m′$ Fig. 7) admitting water to the float and producing the effects first described as the results of said rise in the float. It should be mentioned that as soon as the machine begins to operate, the valve $c$ by which water was first admitted, should be closed. In the manner above described the machine will continue to operate, each rise of the float turning the valve which discharges the water, and produces its descent, which fall in its turn opens the passages for its subsequent rise. The alternate motion of the wheel $p$ causing the continuous rotary motion of the wheels $z$, $z′$ by reason of the arrangement of the wheels W W′, the wheels $z$ $z′$ being by suitable gearing connected with the machinery to be driven.

The float is loaded with a weight equal to half the power due to the head of water raising the float, so as to insure regularity of power in both ascent and descent of the float. The manner in which water is fed to the chamber C will be left to local circumstances as also will many of the various details of the above described arrangement.

What I claim as my invention and desire to secure by Letters Patent, is—

1. The herein described arrangement of mechanism for operating the tube T so that it shall produce the alternate opening and closing of the ingress and egress passages H and G, for letting water to the float and drawing off the same, substantially as herein fully set forth.

2. I also claim the arrangement of the wheels W, W′, and $p$ with their respective shafts and ratchets $r\ r'$, and pawls $n\ n'$, for causing a continued rotary motion of the wheels $z\ z'$, from the alternate motion of the float substantially as herein specified.

In testimony whereof, I have hereunto signed my name before two subscribing witnesses.

LE GRAND C. ST. JOHN.

Witnesses:
　Thos. J. Dudley, Jr.,
　A. S. Merrill.